Jan. 31, 1967     K. W. SORG ETAL     3,300,951
APPARATUS FOR SEPARATION OF LIQUIDS FROM GASES
Filed July 19, 1961
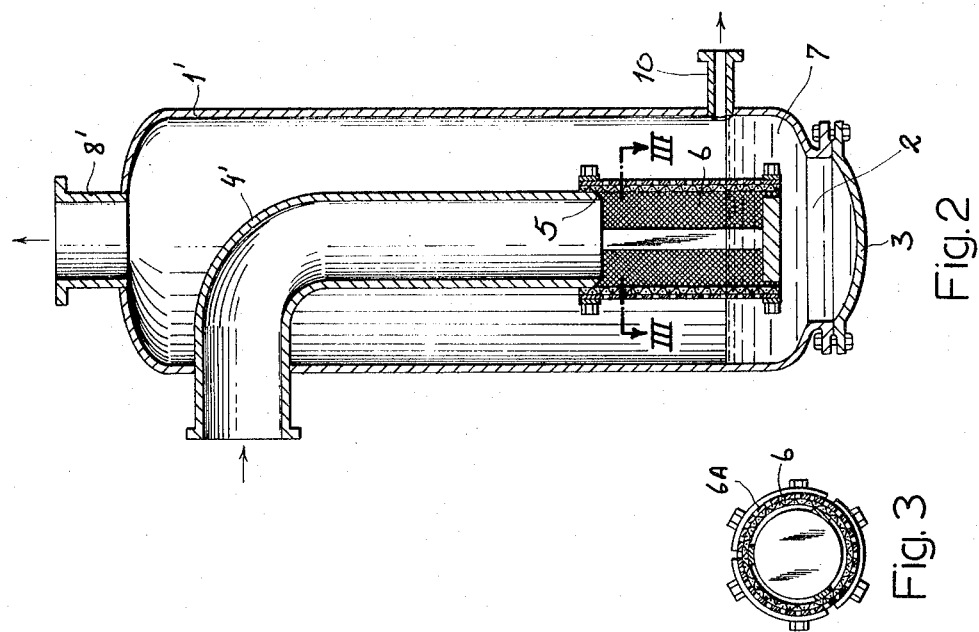
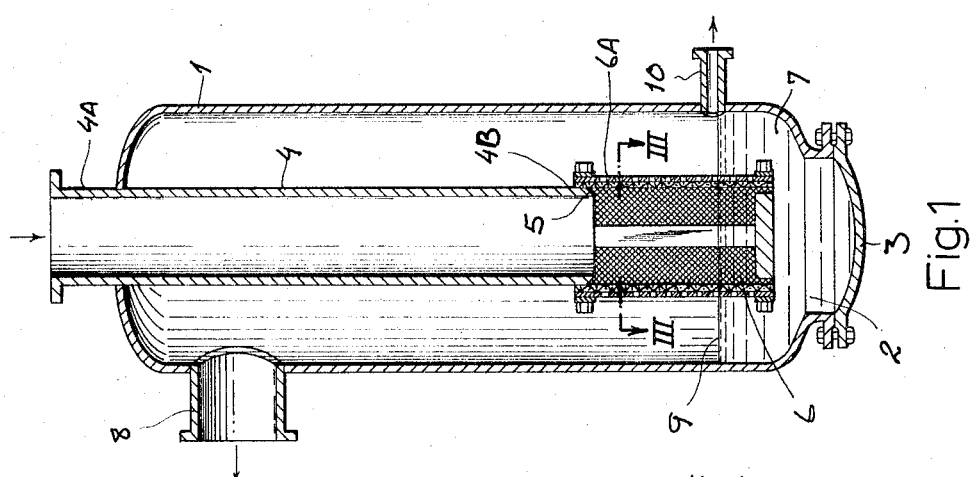
Karl Wilhelm Sorg
Paul Heimbach
*INVENTORS.*
BY
Karl F. Ross
*Attorney*

United States Patent Office 3,300,951
Patented Jan. 31, 1967

3,300,951
APPARATUS FOR SEPARATION OF LIQUIDS FROM GASES
Karl Wilhelm Sorg, Wiesbaden, and Paul Heimbach, Rodenkirchen, near Cologne, Germany, assignors to Linde Aktiengesellschaft, Wiesbaden, Germany
Filed July 19, 1961, Ser. No. 125,262
Claims priority, application Germany, July 22, 1960, G 30,139
2 Claims. (Cl. 55—355)

The present invention relates to the separation of liquids from gases and, more particularly, to an apparatus for separating oily liquids from gases by passing the gases containing liquids through a screen while reversing the direction of flow so that liquid is removed both by being thrown from the gas and by the screen.

Many types of apparatus have been devised in order to separate liquids from gases. One form of such a separator, which is particularly used for separating oil from steam, comprises a receptacle into which the steam is passed; a plurality of parallel wire screens are disposed transversely within the receptacle with respect to the direction of flow of the steam therethrough. In addition, stop or baffle plates are provided so as to cause the steam to flow through all of the screens. The separated oil accumulates at the bottom of the receptacle.

Another conventional separator makes use of a filter which may be in the form of a material which absorbs the liquid retained in the gases. Such filter may comprise a plurality of granular or spherical particles with the gases flowing through the spaces between the particles. The absorbent material may be positioned in a chamber having perforated walls through which the gases flow. In this type of a separator, the separated liquid accumulates in the pores of the absorbent material and cannot be recovered.

A known device for separating steam and compressed air from oil and for returning the recovered oil to its sump comprises a receptacle subdivided into layers by a plurality of sections extending from the inlet end of the receptacle and tapering to their lower ends. The various separated layers of the gases must flow around the vertically extending baffles and then are discharged from the receptacle by passing upwardly along the wall of the receptacle. The gases are withdrawn through a filter arranged in the upper third of the receptacle opposite the inlet. In this type of separator, the separation occurs by the use of baffles and by the movement of gases through a tortuous path.

By making the receptacle of the latter separator of a sufficiently large size, the speed of the gas flowing therethrough may be reduced so that good separation is obtained. However, merely increasing the size of the separating apparatus is not particularly efficient because the cost increase is greater than the gain in separating efficiency and space is at a premium in the buildings in which the separator is to be mounted.

In addition, the size and arrangement of the baffles and other separating components cannot be arbitrarily selected since they must be ultimately positioned within a casing and their size depends upon the dimensions of the casing. Further, the fabrication and the installation of such separating arrangements is rather expensive.

As illustrated by the several above-described examples prior known installations for separating liquids from gases require very expensive installations in order to obtain a satisfactory separating effect.

It is therefore the principal object of this invention to provide a novel and improved apparatus for effectively separating oily liquids from gases.

It is another object of this invention to provide an apparatus for passing gases containing liquids through a gas separator at the most efficient speeds so as to effectively separate the liquids from the gases.

It is a further object of this invention to provide a simplified and inexpensive apparatus for separating liquids, particularly oily liquids, from gases.

The separating apparatus of the present invention comprises a vertically positioned casing which has a cylindrical cross-section and which contains a tube leading to the exterior of the casing. On the lower end of the interior tube is a cylindrical screen whose open lower end extends into an accumulation of liquid which has been separated from the gases and which is collected in the bottom of the casing.

As the incoming stream of gases passes downwardly through the interior tube the large and intermediate-size drops of liquid are thrown to the bottom of the casing as the gas reverses its direction and passes through the cylindrical screen. Small droplets of the liquid are combined by the coagulating effect of the fine screen and are then either discharged downwardly into the bottom of the casing or carried along the screen. Those droplets carried by the screen ultimately drop to the bottom of the casing as the gas flows upwardly therein. Some of the tiny droplets of liquid will contact the inner wall of the interior tube to flow downwardly thereon and to drop from a bevelled edge of the tube into the bottom of the casing.

Only a small portion of the liquid will remain entrained in the gas phase and this portion will be in the form of droplets which have escaped the coagulating effect of the screen. By employing screens having very small mesh sizes the residual content of the liquid in the gases can be kept very small. Tests have shown that the residual content of liquid particles in the gases passing through the subject separator are of the order of 0.2%. It is pointed out that such an efficient separation effect could not hitherto be obtained in previously known separators.

The dimensions of the separation casing are functions of the speeds of the gases in various parts of the casing. It has been determined that a certain range of speeds exists for these gases so that liquids of any kind can be separated from gases or vapors of any kind. Tests also have shown that there is an upper limit to the speed at which the gas should be passed through the casing in order to obtain a good separating effect.

Other objects and advantages of this invention will be apparent upon reference to the accompanying description when taken in conjunction with the following drawing, wherein FIGURE 1 is a vertical sectional view of the separation apparatus of the present invention;

FIGURE 2 is a view similar to that of FIGURE 1 but illustrating a modification of this apparatus; and FIGURE 3 is a sectional view, taken along the line III—III in FIGURES 1 and 2 and illustrates details of the screen construction.

A specific embodiment and a modification thereof will next be described with reference to the drawing wherein like reference symbols indicate the same parts throughout the various views.

The separation apparatus of FIGURE 1 comprises a cylindrical casing 1 which is mounted in a vertical position. The casing has an opening 2 in its bottom which is covered by a removable cover plate 3. The removal of the cover plate 3 permits the cleaning of the separation apparatus and also permits the removal and replacing of the cylindrical screen which is to be presently described. In addition, the cover 3 may be periodically released so as to empty the separation apparatus of the stale accumulated oil.

An inner tube 4 is positioned axially within the casing 1 so as to have an upper end 4A which extends outwardly of the casing through the top thereof and a lower end 4B. The outer edge of the lower end 4B is provided with a bevelled surface indicated at 5. As a result of this bevel-edge construction the liquids accumulating on the interior of the tube 4 drop from the tube 4 to the bottom of the casing without accumulating on the screen 6.

The cylindrical screen 6 is mounted on the lower end 4B of the tube 4. The diameter of this screen is greater than the interior diameter of the tube 4. The cylindrical screen is surrounded by a cylindrical supporting member 6A which is perforated and the screen 6 is formed from a suitable metal or plastic and has a mesh size ranging from 0.1 to 3.0 millimeters. This range is preferably from 0.2 to 1.0 millimeter with the most effecitve mesh size being about 0.3 millimeter.

The lower end of the screen 6 extends into an accumulation of liquid 7 which has previously been separated from the gases passing through the separation apparatus and has been accumulated in the bottom or sump of the casing 1.

An outlet-pipe connection 8 is provided in the wall of the casing 1 at the upper half thereof. In the lower half of the casing 1 there is connected an overflow pipe 10 which limits the level of the liquid 7 to the level designated at 9.

In the embodiment of the separation apparatus as illustrated in FIGURE 1, the inner tube 4 is generally straight so that the gas enters the separator in a straight line but is discharged through an outlet 8 which lies at an angle of 90° to the path of the gases flowing through the casing.

It is also possible to construct this separation apparatus so that the gas enters the casing through an inlet mounted in the side wall of the casing, whereby the recovered gas is discharged from the apparatus through an outlet positioned in the top of the casing.

This modification of the separation apparatus is illustrated in FIGURE 2 wherein the upper end of the tube 4' has a 90° bend therein and extends through the side wall of the casing 1'. The outlet pipe 8' of the casing is positioned at the top of the casing 1'.

It has been determined that the following are the optimum and maximum speeds at which the gases should be passed through various portions of the gas separation apparatus:

$$7.5 \times 10^{-9} \times \frac{\gamma}{\eta} = w_1 15 \times 10^{9} \times \frac{\gamma}{\eta}$$

$$4.0 \times 10^{-9} \times \frac{\gamma}{\eta} = w_2 10 \times 10^{-9} \times \frac{\gamma}{\eta}$$

$$4.0 \times 10^{-9} \times \frac{\gamma}{\eta} = w_3 10 \times 10^{-9} \times \frac{\gamma}{\eta}$$

wherein $w_1$ is the speed of the gas expressed in meters/sec. in the interior tube;

$w_2$ is the speed of the gas through the free cross-section of the screen, expressed in meters/sec.;

$w_3$ is the speed of the gas in the shell space, expressed in meters/sec.;

$\gamma$ (the Greek letter gamma) is the density, expressed in kg./m.$^3$ of the liquid to be separated from the gas;

$\eta$ (the Greek letter eta) is the dynamic viscosity of the gas or vapor; expressed in kg./sec./meter$^2$.

The speed of the gas through the inner tube, 4' can be relatively great with respect to the shell space since the large and middle-size drops of liquid are thrown out of the gas as it passes through this tube. The speed of the gas through the free cross-section of the screen is approximately equal to the speed of the gas in the casing outside of the tube 4, 4'. It is pointed out that the speed of the gases is a function of the dynamic viscosity of the gas and of the density of the liquid which is to be separated. Accordingly, the above-mentioned speed values will also depend on the required purity of the gas which is to be obtained after the liquid is separated therefrom.

In the operation of the separation apparatus of this invention the gas containing the liquid enters the apparatus through the inner tube 4, 4'. The large and middle-size drops of liquid in the gas are thrown out of the gas onto the liquid level 9 and accumulate in the bottom of the casing. The liquid film which eventually accumulates on the inner wall of the tube 4, 4' flows downwardly and off the tube from the bevel edge 5. The small droplets of liquid in the gas accumulate to form larger droplets due to the known coagulating effect of the fine screen 6. These drops then either flow downwardly along the screen 6 or are carried along by the gaseous stream wherein a portion of these drops falls into the accumulation of liquid 7 before the gas is discharged from the separation apparatus through the outlet 8, 8'.

The separated gas which will contain only a small residual amount of liquid then flows upwardly within the casing 1 outside of the tube 4. The gas is then discharged through the outlet which may be located in either the upper portion of the wall of the casing or in the top of the casing.

This is can be seen that the present invention provides a simple yet effective apparatus for separating liquids from gases. This apparatus is particularly suitable for separating oily liquids. As a result of tests it has been shown that this apparatus is far more effective than previously known separation apparatuses since the amount of residual liquid left in the separated gas is of the order of 0.2%.

It will be understood that this invention is susceptible to modification in order to adapt it to different usages and conditions and, accordingly, it is desired to comprehend such modifications within this invention as may fall within the scope of the appended claims.

What is claimed as this invention is:

1. An apparatus for removing entrained droplets of an oily liquid having a density $\gamma$ kg./m.$^3$ from a gas stream having dynamic viscosity $\eta$ kg.-sec./m.$^2$, comprising:

a generally cylindrical casing having a substantially vertical axis, a closed bottom and upper and lower casing portions;

means including an overflow passage in said lower casing portion for maintaining therein a body of said liquid with an upper liquid surface above said closed bottom;

an inlet pipe for supplying said gas stream to said casing having a substantially straight portion extending axially downwardly within said casing and terminating at a lower extremity of said pipe above said liquid surface;

an open-end generally cylindrical gas-permeable screen substantially coaxial with and affixed to said pipe at said lower extremity, while extending downwardly therefrom into said body of liquid below said surface whereby an annular portion of said screen lies between said lower extremity and said upper surface, said inlet pipe having a flow cross-section such that the velocity of the gas stream through said straight portion is of the order of $10^{-9} \times \gamma/\eta$ but less than $15 \times 10^{-9} \gamma/\eta$ meters/sec., said annular portion of said screen having a through-flow cross-section such that the gas stream passing therethrough has a velocity of the order of $10^{-9} \times \gamma/\eta$ meters/sec. but less than $10 \times 10^{-9} \gamma/\eta$ meters/sec.; and an outlet at said upper portion of said casing for conveying gas therefrom, said casing defining with said inlet pipe an annular chamber receiving gas from said screen, said chamber having a cross-section such that the velocity of the gas stream passing therethrough to said outlet is of the order of $10^{-9} \times \gamma/\eta$ but less than $10 \times 10^{-9} \gamma/\eta$ meters/sec., said casing being provided with an aperture aligned with said axis at said bottom of said casing and of a diameter sufficient to permit said screen to pass axially therethrough, and a cover registering with said aperture and removably mounted upon said casing for normally closing said aperture to retain said body of liquid in said casing, the exterior surface of said pipe having an inwardly and downwardly beveled lower edge within said screen whereby droplets of liquid along an inner surface of said pipe drip from said beveled lower edge into said body of liquid without contact with said screen.

2. An apparatus as defined in claim 1 wherein said screen is a mesh whose openings are of a mesh size ranging between substantially 0.1 and 3.0 mm., said apparatus further comprising a perforate cylindrical shell surrounding said screen for supporting same.

References Cited by the Examiner

UNITED STATES PATENTS

| | | | |
|---|---|---|---|
| 569,203 | 10/1896 | Hunt | 55—498 X |
| 889,694 | 6/1908 | Lambert. | |
| 1,487,585 | 3/1924 | McKelvy. | |
| 1,664,670 | 4/1928 | Dollins | 55—250 |
| 1,857,512 | 5/1932 | Matteson | 55—233 |
| 1,952,740 | 3/1934 | Winslow. | |
| 1,980,522 | 11/1934 | Hawley | 55—227 X |
| 1,994,766 | 3/1935 | Heglar | 55—253 |
| 2,004,467 | 6/1935 | Hawley | 55—95 X |
| 2,083,649 | 6/1937 | Heglar | 55—252 X |
| 2,159,551 | 5/1939 | Darnell | 55—253 X |
| 2,405,494 | 8/1946 | Dupuy | 55—252 |
| 2,575,400 | 11/1951 | Shirk et al. | 55—253 |
| 3,029,581 | 4/1962 | Robbins | 55—318 |

FOREIGN PATENTS

| | | |
|---|---|---|
| 504,241 | 7/1954 | Canada. |
| 628,501 | 6/1927 | France. |
| 54,201 | 11/1890 | Germany. |
| 668,259 | 11/1938 | Germany. |
| 13,510 | 1907 | Great Britain. |
| 240,974 | 10/1925 | Great Britain. |
| 242,388 | 11/1925 | Great Britain. |
| 307,707 | 1/1930 | Great Britain. |
| 273,917 | 5/1930 | Italy. |
| 425,342 | 10/1942 | Italy. |

HARRY B. THORNTON, *Primary Examiner.*

R. F. BURNETT, E. F. BLANCHARD, *Examiners.*

D. TALBERT, D. K. WEDDING, *Assistant Examiners.*